US009592945B2

(12) United States Patent
Kogure

(10) Patent No.: US 9,592,945 B2
(45) Date of Patent: Mar. 14, 2017

(54) BUTT SEAMED PACKAGE BAG AND METHOD FOR USING SAME

(71) Applicant: TAISEI LAMICK CO., LTD., Saitama (JP)

(72) Inventor: Hidenori Kogure, Saitama (JP)

(73) Assignee: TAISEI LAMICK CO., LTD., Saitama (JP)

( * ) Notice: Subject to any disclaimer, the term of this patent is extended or adjusted under 35 U.S.C. 154(b) by 0 days.

(21) Appl. No.: 14/376,732

(22) PCT Filed: Feb. 19, 2013

(86) PCT No.: PCT/JP2013/053912
§ 371 (c)(1),
(2) Date: Aug. 5, 2014

(87) PCT Pub. No.: WO2013/125499
PCT Pub. Date: Aug. 29, 2013

(65) Prior Publication Data
US 2015/0016757 A1   Jan. 15, 2015

(30) Foreign Application Priority Data

Feb. 21, 2012   (JP) ................................. 2012-035029

(51) Int. Cl.
*B65D 77/38*   (2006.01)
*B65D 75/58*   (2006.01)
(Continued)

(52) U.S. Cl.
CPC .............. *B65D 77/38* (2013.01); *B29C 65/18* (2013.01); *B29C 65/76* (2013.01);
(Continued)

(58) Field of Classification Search
CPC ........ B65D 2581/3494; B65D 81/3461; B65D 2205/00; B65D 77/38; B65D 75/5855;
(Continued)

(56) References Cited

U.S. PATENT DOCUMENTS 3,986,640 A * 10/1976 Redmond .............. B65D 75/30
206/469
4,236,652 A * 12/1980 Beguhn ................ B65D 75/585
206/484
(Continued)

FOREIGN PATENT DOCUMENTS

JP   3-124581   5/1991
JP   7-132944   5/1995
(Continued)

OTHER PUBLICATIONS

Int'l Preliminary Report on Patentability from International Patent Appl. No. PCT/JP2013/053912 having mail date Aug. 21, 2014.
(Continued)

*Primary Examiner* — Peter Helvey
(74) *Attorney, Agent, or Firm* — Greenblum & Bernstein, P.L.C.

(57) ABSTRACT

A rectangular, flexible butt-seamed package bag and a method for using the same is provided in which the pouring of a single type of a liquid packing material filled and packed in the filling space for the packed material from the package bag can be easily performed. A butt-seamed package bag formed by joining both side portions of a sealant layer of a laminate film for packing to each other at a butt state and joining bottom portions or top portions thereof to define a filling space for a single packed material, characterized in that a pouring path for the packed material is disposed in a middle part of a butt-seamed joint portion in an extending direction thereof, and at least a part of the pouring path is provided with an easily separable portion having a joint
(Continued)

strength relatively lower than that of the butt-seamed joint portion.

29 Claims, 6 Drawing Sheets

(51) Int. Cl.
| B65B 51/26 | (2006.01) |
|---|---|
| B65B 3/04 | (2006.01) |
| B65B 7/02 | (2006.01) |
| B65D 77/10 | (2006.01) |
| B65B 51/14 | (2006.01) |
| B65B 61/18 | (2006.01) |
| B29C 65/18 | (2006.01) |
| B29C 65/76 | (2006.01) |
| B29C 65/82 | (2006.01) |
| B29C 65/00 | (2006.01) |
| B29L 31/00 | (2006.01) |
| B29C 65/08 | (2006.01) |
| B29C 65/38 | (2006.01) |

(52) U.S. Cl.
CPC ........ *B29C 65/8246* (2013.01); *B29C 66/133* (2013.01); *B29C 66/3452* (2013.01); *B29C 66/4322* (2013.01); *B29C 66/723* (2013.01); *B29C 66/81465* (2013.01); *B29C 66/83413* (2013.01); *B29C 66/83543* (2013.01); *B29C 66/8511* (2013.01); *B65B 3/04* (2013.01); *B65B 7/02* (2013.01); *B65B 51/14* (2013.01); *B65B 51/26* (2013.01); *B65B 61/18* (2013.01); *B65D 75/5855* (2013.01); *B65D 75/5866* (2013.01); *B65D 77/10* (2013.01); *B29C 65/08* (2013.01); *B29C 65/38* (2013.01); *B29C 66/71* (2013.01); *B29C 66/73713* (2013.01); *B29L 2031/7128* (2013.01); *B65B 2220/08* (2013.01)

(58) Field of Classification Search
CPC .... B65D 75/5866; B65D 77/10; B29C 65/00; B29C 66/1122; B29C 65/18; B29C 65/76; B29C 65/8246; B29C 65/38; B29C 65/08; B29C 66/133; B29C 66/3452; B29C 66/4322; B29C 66/723; B29C 66/81465; B29C 66/83413; B29C 66/83543; B29C 66/8511; B29C 66/71; B29C 66/73713; B65B 51/26; B65B 3/04; B65B 7/02; B65B 51/14; B65B 61/18; B65B 2220/08; B29L 2031/7128
USPC .......................................... 383/36, 210, 211
See application file for complete search history.

(56) References Cited

U.S. PATENT DOCUMENTS

| 4,358,466 | A | * | 11/1982 | Stevenson | B29C 65/02 383/100 |
|---|---|---|---|---|---|
| 4,724,982 | A | * | 2/1988 | Redmond | B65D 75/367 206/469 |
| 4,795,271 | A | * | 1/1989 | Lane, Jr. | B65D 75/5822 229/308 |
| 4,810,844 | A | * | 3/1989 | Anderson | B65D 31/10 219/727 |
| 4,872,556 | A | * | 10/1989 | Farmer | B65D 75/5822 222/107 |
| 4,890,744 | A | * | 1/1990 | Lane, Jr. | B65D 75/5822 206/484 |
| 5,131,760 | A | * | 7/1992 | Farmer | B65D 75/58 206/484 |
| 5,241,150 | A | * | 8/1993 | Garvey | B65D 75/5811 219/725 |
| 5,368,199 | A | * | 11/1994 | Haas | B05C 17/00546 219/679 |
| 5,395,031 | A | * | 3/1995 | Redmond | B65D 75/367 206/469 |
| 5,718,356 | A | * | 2/1998 | Nottingham | B05C 17/00546 219/687 |
| 5,770,839 | A | * | 6/1998 | Ruebush | B65D 81/3469 219/727 |
| 8,113,730 | B2 | * | 2/2012 | Maloney | A47L 13/17 206/229 |
| 8,684,601 | B2 | * | 4/2014 | Perell | B65D 75/5855 383/210 |
| 8,714,855 | B2 | * | 5/2014 | Littig | B65D 75/366 15/104.93 |

FOREIGN PATENT DOCUMENTS

| JP | 10-95472 | 4/1998 |
|---|---|---|
| JP | 10-218199 | 8/1998 |
| JP | 11-020805 | 1/1999 |
| JP | 11-227796 | 8/1999 |
| JP | 2001-206387 | 7/2001 |
| JP | 2001-353069 | 12/2001 |
| JP | 2002-249177 | 9/2002 |
| JP | 2002308348 | 10/2002 |
| JP | 2003-012033 | 1/2003 |
| JP | 2005-200022 | 7/2005 |
| JP | 2008-162664 | 7/2008 |
| JP | 2011-116394 | 6/2011 |

OTHER PUBLICATIONS

International Search Report from International Patent Appl. No. PCT/JP2013/053912 having mail date Apr. 23, 2013, along with English-language translation thereof.
Japanese Office Action having mail date of Jul. 1, 2014, along with English-language translation thereof.

* cited by examiner

BUTT SEAMED PACKAGE BAG AND METHOD FOR USING SAME

TECHNICAL FIELD

The present invention relates to a butt-seamed package bag and a method for using the same, and proposes the technique wherein a liquid packed material can be easily poured from a package body, which is formed by filling and packing, for example, a relatively small quantity of a single type liquid packing material such as a liquid material, a viscous stuff or the like into a flexible package bag, to a predetermined position without subjecting the package bag to tearing or cutting, that is, without generating a torn piece, a cut-off piece or the like.

BACKGROUND ART

When a liquid packed material such as a liquid material like soups, flavorings, oils, liquors, dressings, etc., a viscous stuff like a mustard, a green horseradish paste, etc. or others is poured from a package body of a flexible package bag filled with the liquid packing material, as disclosed in Patent Document 1, the pouring is generally and traditionally performed by tearing a joint portion of the package bag defining a filling space for the packed material such as heat seal or the like from a position of a tear-inducing flaw such as I-shaped notch, V-shaped notch or others formed on an outer edge of the joint portion to reach at least the filling space for the packed material with fingers, or by cutting a corner of the package bag with scissors or the like.

PRIOR ART DOCUMENTS

Patent Document

Patent Document 1 : JP-A-H07-132944

SUMMARY OF THE INVENTION

Task to be Solved by the Invention

When the joint portion of the package bag is torn by pinching with fingers, a considerably large force is often required in relation to the breakage strength of the package bag, so that the tearing is extremely difficult for children, elders and the like having a weak pinching force, and also there is a problem that the liquid packed material is frequently poured to undesired portions if the bag is pinched up to the filling space for the packed material so as to strengthen the pinching forces. Further, when the corner of the package bag is cut out, the usage of a tool such as a scissors or the like is unavoidable, and there is a problem that it is obliged to dispose cut-off pieces and so on so as not to incorporate into foods and the like.

The present invention has a task for solving the aforementioned problems inherent to the conventional techniques and is to provide a rectangular, flexible butt-seamed package bag and a method for using the same in which the pouring of a single type of a liquid packing material filled and packed in the filling space for the packed material from the package bag can be easily performed irrespective of age and sex and the use of the tool such as scissors or the like is not required and the disposal of the cut-off pieces or the like cannot be required.

Solution for Task

A butt-seamed package bag according to the invention is a flexible package bag of, for example, a rectangular form as a plain profile form formed by joining both side portions of a sealant layer of a laminate film for packing to each other at a butt state and joining bottom portions or top portions thereof to define a filling space for a single packed material and being capable of storing and transporting in a flat posture, characterized in that a pouring path for the packed material is a back lined joint portion and is disposed in a middle part of a butt-seamed joint portion in an extending direction thereof, and at least a part of the pouring path is provided with an easily separable portion having a joint strength weaker than that of the butt-seamed joint portion and blocking the pouring path at a relatively low force to, for example, contribute to define the filling space for the packed material.

In such a package, it is preferable that a width of the pouring path, that is, a width of the butt-seamed joint portion in the extending direction is gradually narrowed as it is separated from the filling space for the packed material. Alternatively, the width of the pouring path may be constant from the filling space for the packed material to an exit of the pouring path or over a full length in the extending direction of the pouring path.

It is preferable that the easily separable portion is provided adjacent to an exit of the pouring path or over the whole in the extending direction of the pouring path.

Further, it is preferable that the easily separable portion is provided on plural required places in the extending direction of the pouring path.

A method for using a package bag according to the present invention is characterized in that a package body is formed by filling and packing a single type liquid packing material in a filling space for a packed material of a butt-seamed package bag wherein the butt-seamed joint portion as mentioned above is a back lined joint portion and is folded at a mountain state about the back lined joint portion and the liquid packed material is poured through a pouring path by pressing the filling space for the packed material in a thickness direction to separate the easily separable portion.

Effect of the Invention

In the butt-seamed package bag of the present invention, the package body is formed by filling and packing the single type of a liquid packing material into the filling space for the single packed material and the filling space for the packed material is pressed in the thickness direction to separate the easily separable portion disposed in the pouring path, whereby the liquid packed material can be easily poured through the pouring path to a given position under the action of a relatively low pressing force.

In the package bag, therefore, it is not necessary to pinch and tear the package bag with fingers and to cut off the corner of the package bag with scissors or the like in the pouring of the liquid packed material, so that the packed material can be poured to the predetermined position very easily and accurately irrespective of age and sex and without generating the cut-off pieces.

Especially, when the butt-seamed joint portion having the pouring path is a back lined joint portion, the thickness of the package body is made to approximately 2 times by folding at a mountain state about the back lined joint portion in the pouring of the liquid packed material and the filling space for the packed material is pressed in the thickness direction to separate the easily separable portion disposed in the pouring path, whereby the liquid packed material can be easily poured to the predetermined position through the pouring path under the action of the relatively low pressing force.

When the width of the pouring path is gradually narrowed with increasing the distance from the filling space for the packed material, even if the viscosity of the liquid packed material is small, the packed material can be poured accurately to the predetermined position by turning the exit of the pouring path to the required direction.

On the other hand, when the width of the pouring path is constant over the full length of the extending direction of the pouring path, the packed material can be poured as intended by easily separating the easily separable portion even if the pressing forces to the filling space for the packed material in the folded package body is made low in the pouring of a particularly high-viscosity liquid packed material reduced.

When the easily separable portion is provided adjacent to the exit of the pouring path, the volume of the filling space for the packed material can be made maximum. Moreover, if the easily separable portion is provided adjacent to a narrow-width exit of the pouring path, a fear of an unintended leakage of the liquid packed material can be removed more sufficiently by increasing the bag breakage strength in the easily separable portion.

And also, when the easily separable portion is provided over the whole of the extending direction of the pouring path, the unintended bag breakage in the easily separable portion can be prevented more effectively regardless the form of the pouring path.

When the easily separable portions are provided at plural places in the extending direction of the pouring path, even if the unintended bag breakage occurs in one or more of the easily separable portions, the leakage of the liquid packed material can be prevented effectively under the action of the other easily separable portions.

In the method for using the package bag according to the present invention, since the butt-seamed joint portion providing the pouring path in the package bag is the back lined joint portion as mentioned above, when the liquid packed material is poured by folding the package body at a mountain state about the back lined joint portion so as to render the thickness of the package body into approximately 2 times and pressing the filling space for the packed material, it is unnecessary to tear the package bag by pinching the joint portion of the package bag with fingers or to cut off the corner of the package bag with tools such as scissors or the like, and hence the liquid packed material can be poured easily and accurately to the predetermined position even by anyone having a weak pinching force or the like without generating the cut-off pieces.

EMBODIMENTS FOR CARRYING OUT THE INVENTION

Hereinafter, embodiments according to the present invention will be described with reference to the drawings.

Figure 1:
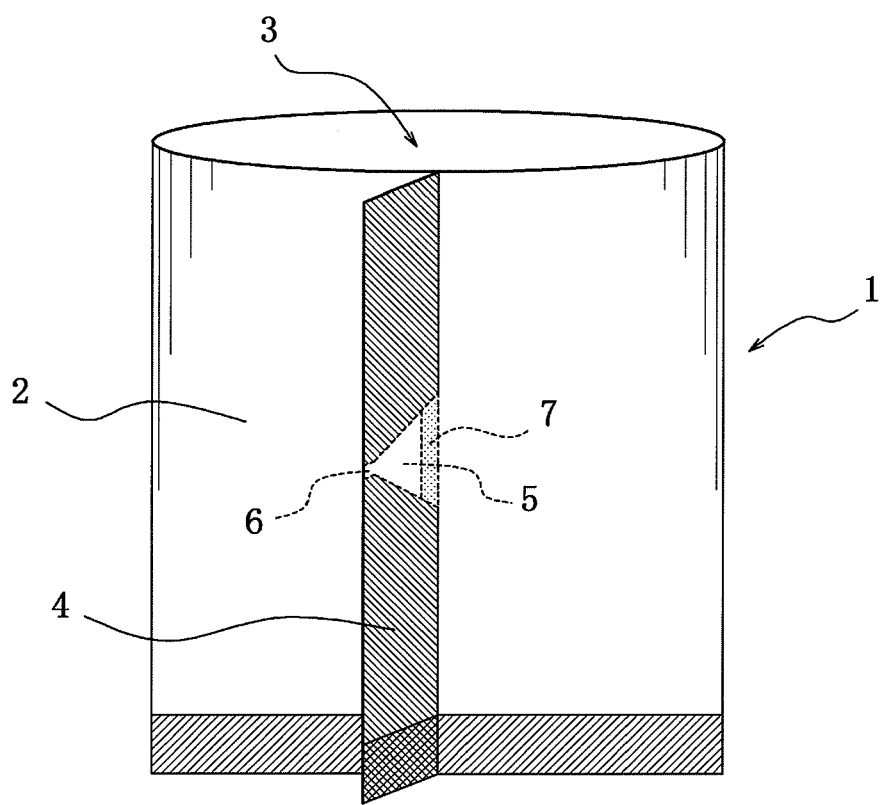
FIG. 1 is a perspective view showing one embodiment of the butt-seamed package bag according to the present invention.

In an embodiment of a package bag shown in FIG. 1, a flexible butt-seamed package bag 1 is constituted by joining both side portions of a sealant layer of a laminate film 2 for package having a two or more layer structure to each other through heat sealing, impulse sealing, high frequency welder sealing, ultrasonic sealing or the like at a butt-seamed state as shown by hatched lines in the figure and joining a bottom portion or a top portion thereof other than an opening portion for filling a liquid packing material, particularly a bottom portion in the figure as shown by hatched lines to define a single filling space 3 for a packed material. The butt-seamed package bag 1 may be rectangular as a profile shape in planar view of locating the butt-seamed joint portion 4 on a top face side, a bottom face side or the like.

As clearly shown in perspective views of FIGS. 2(a) and (b), one pouring path 5 for the packed material is provided on a middle portion in an extending direction of the butt-seamed back line joint portion 4 of the butt-seamed package bag 1.

Moreover, the illustrated pouring path 5 becomes gradually narrow in the width corresponding to the extending direction of the back lined joint portion 4 as it is separated from the filling space 3 for the packed material. However, the width of the pouring path 5 can be gradually widened as it is separated from the filling space 3 or can be constant over the whole of extending direction of the pouring path 5.

An opening width of an exit 6 of the pouring path 5 is preferable to be made smaller as the viscosity of the liquid packed material becomes small irrespectively of the form of the pouring path 5 in order to enhance the accuracy of the pouring direction of the packed material.

Figure 2:
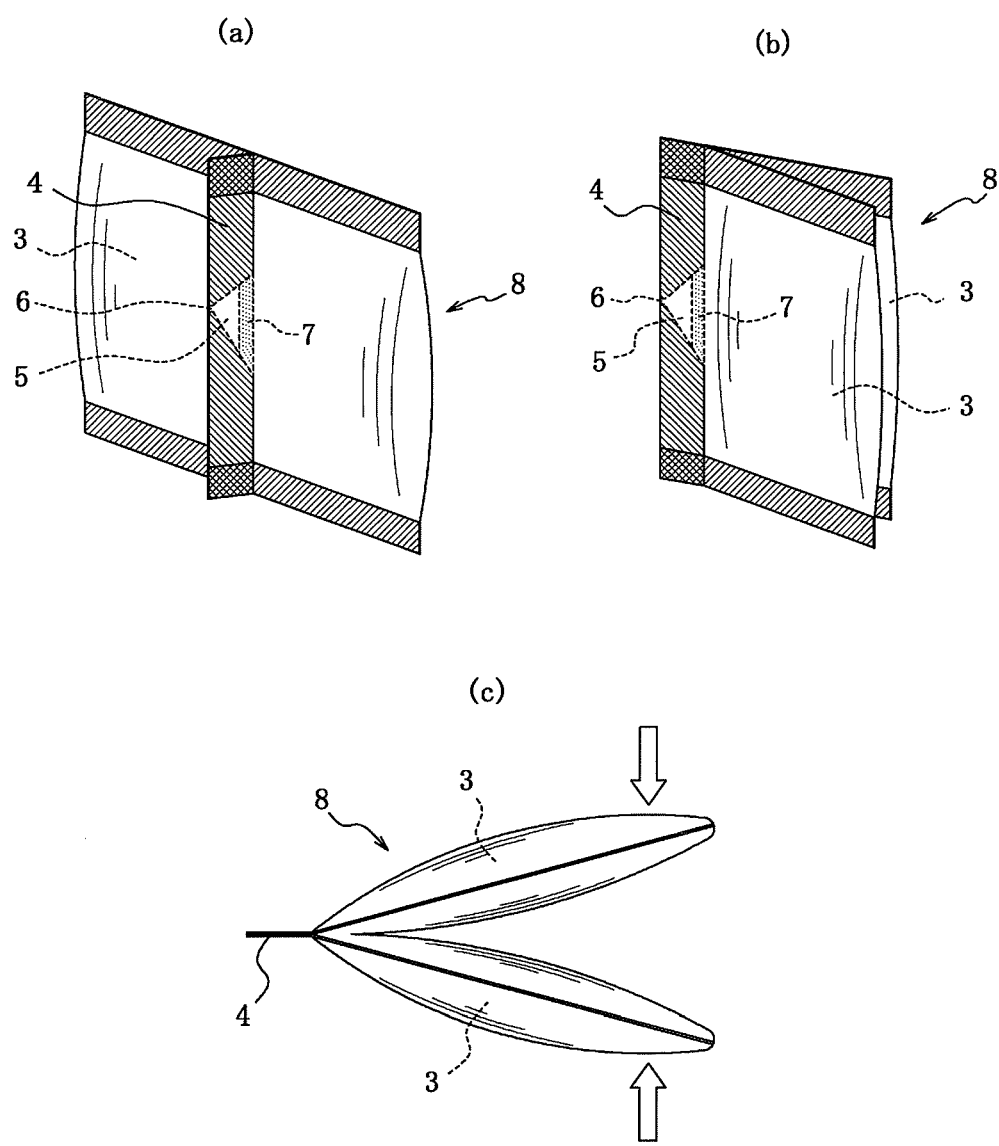
FIG. 2 is a schematic view of a package body formed by filling and packing one kind of liquid packing materials into a single filling space for the packed material in the package bag shown in FIG. 1.

FIG. 2(a) is a perspective view of the package body viewed from the side of the back lined joint portion, FIG. 2 (b) is a perspective view of the package body folded about the back lined joint portion 4 at a mountain state, and FIG. 2(c) is a plain view of FIG. 2(b).

A single easily separable portion 7 extending across the pouring path 5 and having a joint strength relatively lower than that of the back lined joint portion 4 is disposed on at least a part of the pouring path 5, i.e. an edge portion thereof at the side of the filling space 3 for the packed material in FIG. 2 as shown by dots in the figure.

In the flexible butt-seamed package bag 1, a given amount of a liquid packing material is filled into the filling space 3 for a packed material, for example, from an opening port at its upper end and joined at the top portion of the package bag 1 preferably under deaeration to form a package body 8 filled with the packed material as shown in FIG. 2.

Accordingly, the package bag 1 can produce the action and effects as mentioned above by pressing the filling space 3 for the packed material in a direction shown by an arrow in FIG. 2(c) and under the separating action of the easily separable portion 7 when the liquid packed material is poured from the package body 8. Especially, when the package bag 1 is a back lined seal bag as shown in FIG. 2, the thickness of the package body 8 can be made to approximately 2 times by folding about the back lined joint portion 4 at a mountain state, so that the liquid packed material can be poured by easily separating the easily separable portion 7 disposed in the pouring path 5 with a small pressing force.

Figure 3:
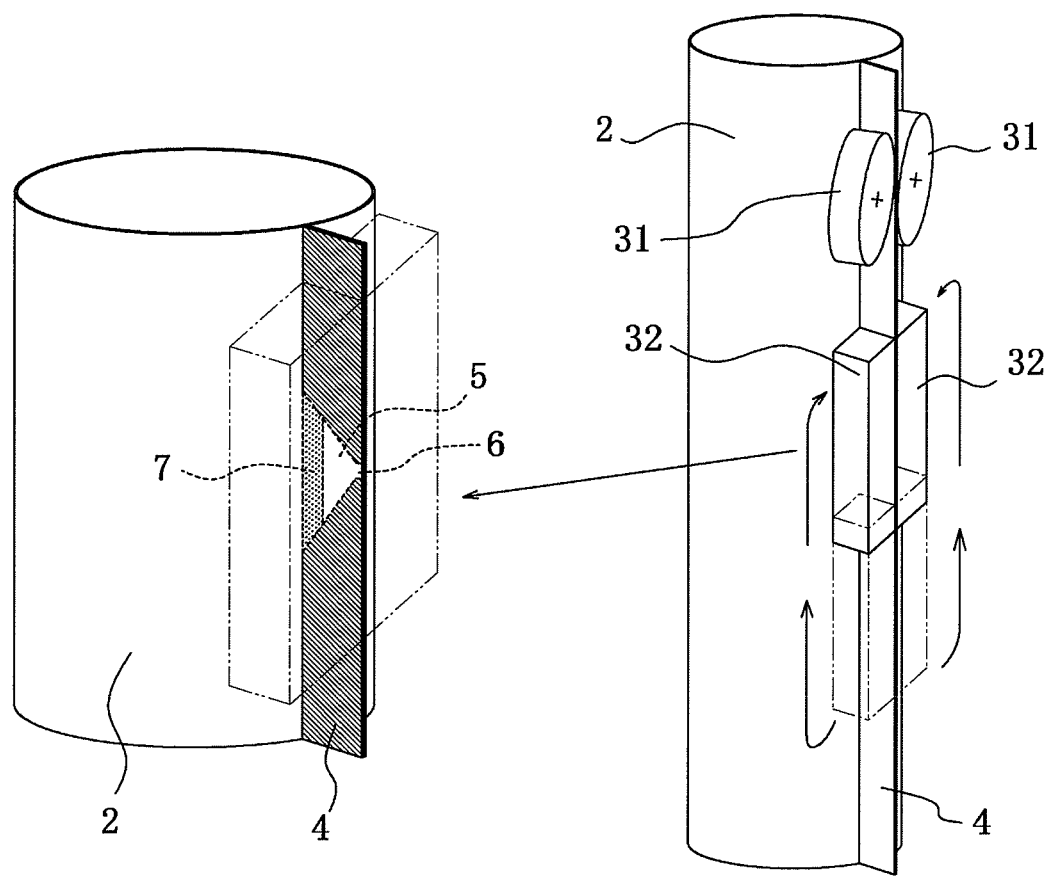
FIG. 3 is a perspective view showing an example of forming a butt-seamed joint portion and easily separable portions in the package bag shown in FIG. 1.

Moreover, the back lined joint portion 4 in the butt-seamed package bag 1 as shown in FIG. 1 can be formed, for example, by heat sealing both side portions of a sealant layer of a cylindrically formed laminate film 2 for package corresponding to a portion of a filling space 3 for a packed material at a butt-seamed state by means of a pair of heat seal rollers 11 having at least one of heating temperature and pressing force set to a relatively low value to form an easily separable portion 7 over a full length of the laminate film 2 for package and sufficiently strongly back lined joining free end side portions of the sealant layer inclusive of the easily separable portion 7 at a butt-seamed state so as to leave a required shape portion of a pouring path 5 by means of a pair of box motion type heat sealing blades 12 or the like to form a back lined joint portion 4 of a required width as shown in FIG. 3.

Figure 4:
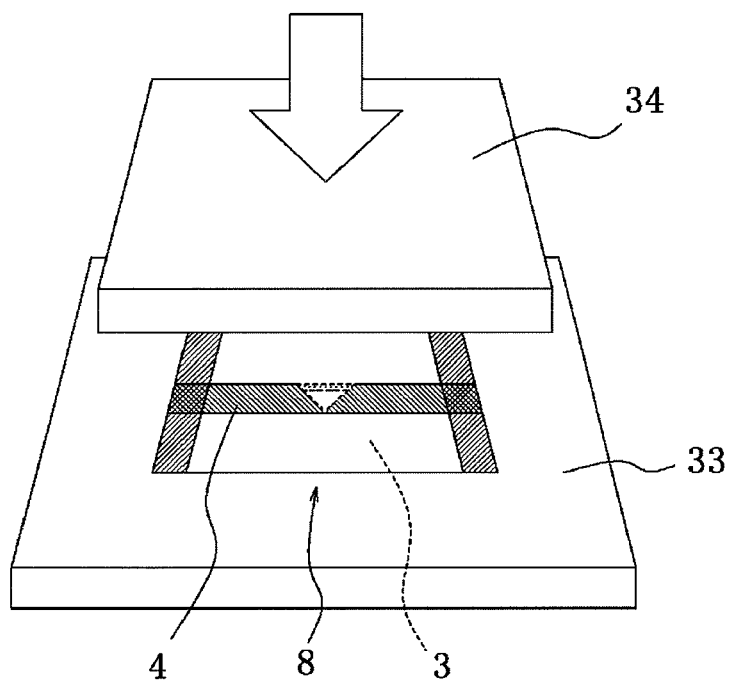
FIG. 4 is a schematic view illustrating a test embodiment for a bag breakage strength of a butt-seamed joint portion including easily separable portions.

The bag breakage strength of the thus formed back lined joint portion 4 can be measured, for example, by placing the package body 8 formed by filling and packing a single type liquid packing material into the butt-seamed package bag 1 as shown in FIG. 2 onto a flat undersurface plate 13 at a flat posture as shown by a perspective view in FIG. 4 and pressing the package body 8 with a flat top surface plate 14 until the breakage of the back lined joint portion 4 is caused.

By the way, when a package bag of 55 mm in width and 100 mm in length is made from a laminate film for package formed by laminating a biaxially-oriented nylon film of 15 μm with a straight-chain low density polyethylene of 50 μm in thickness as a sealant layer and a width of a back lined joint portion of a package body formed by filling and packing 4 ml of water into the filling space for the packed material is 10 mm, the bag breakage strength of the package body according to the present invention provided at its end portion side the filling space 3 for package with an easily separable portion 7 of 2 mm in width and having a width of the pouring path 5 gradually reduced from 5 mm side the filling space 3 for package to 2 mm at the pouring path exit 6 is 5077 N, while the bag breakage strength of the conventional package body having neither a pouring path nor an easily separable portion in the back lined joint portion is 6337 N.

It is understood from this fact that the decreasing ratio of the bag breakage strength of the package body 8 in the present invention is about 20% and the package body 8 of the butt-seamed package bag 1 according to the present invention can sufficiently develop the required bag breakage strength at a flat posture and can prevent the unexpected breakage of the package bag effectively in the storing, transportation and the like of the package body 8.

Figure 5:
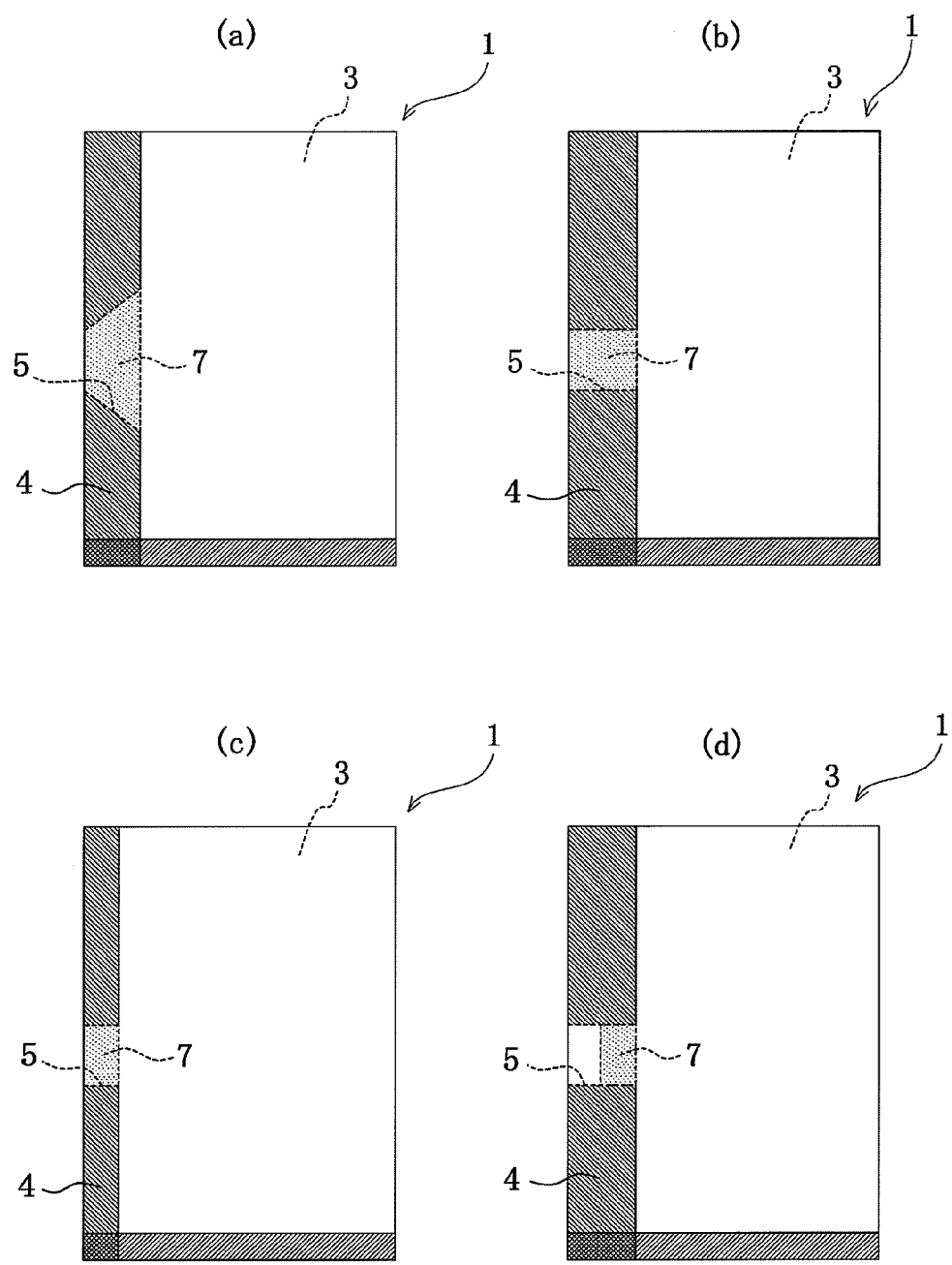
FIG. 5 is a schematic view showing a modification embodiment of forming a pouring path and easily separable portions in a package bag when a butt-seamed joint portion is folded at a mountain state.

In FIG. 5 showing modification examples of the package bag, FIG. 5(*a*) is a case that the width of the pouring path 5 is gradually narrowed as it is separated from the filling space 3 for the packed material and the easily separable portion 7 is formed over the full length of the pouring path 5. And also, FIGS. 5(*b*), (*c*) and (*d*) are a case that the width of the pouring path 5 is constant over the full length of the extending direction of the pouring path 5. FIGS. 5(*b*) and (*c*) are a case that the whole of the pouring path 5 is an easily separable portion 7, and FIG. 5(*d*) is a case that a half of the extending length of the pouring path 5 side the filling space 3 is an easily separable portion 7.

The extending length of the pouring path 5 shown in FIG. 5(*c*) is about half of that shown in FIG. 5(*b*).

Even in these modification examples shown in FIG. 5, the same desired effect as mentioned above can be realized based on the separation of the easily separable portion 7 by pressing the filling space 3 for the packed material in the pouring of the liquid packed material from the package body.

Figure 6:
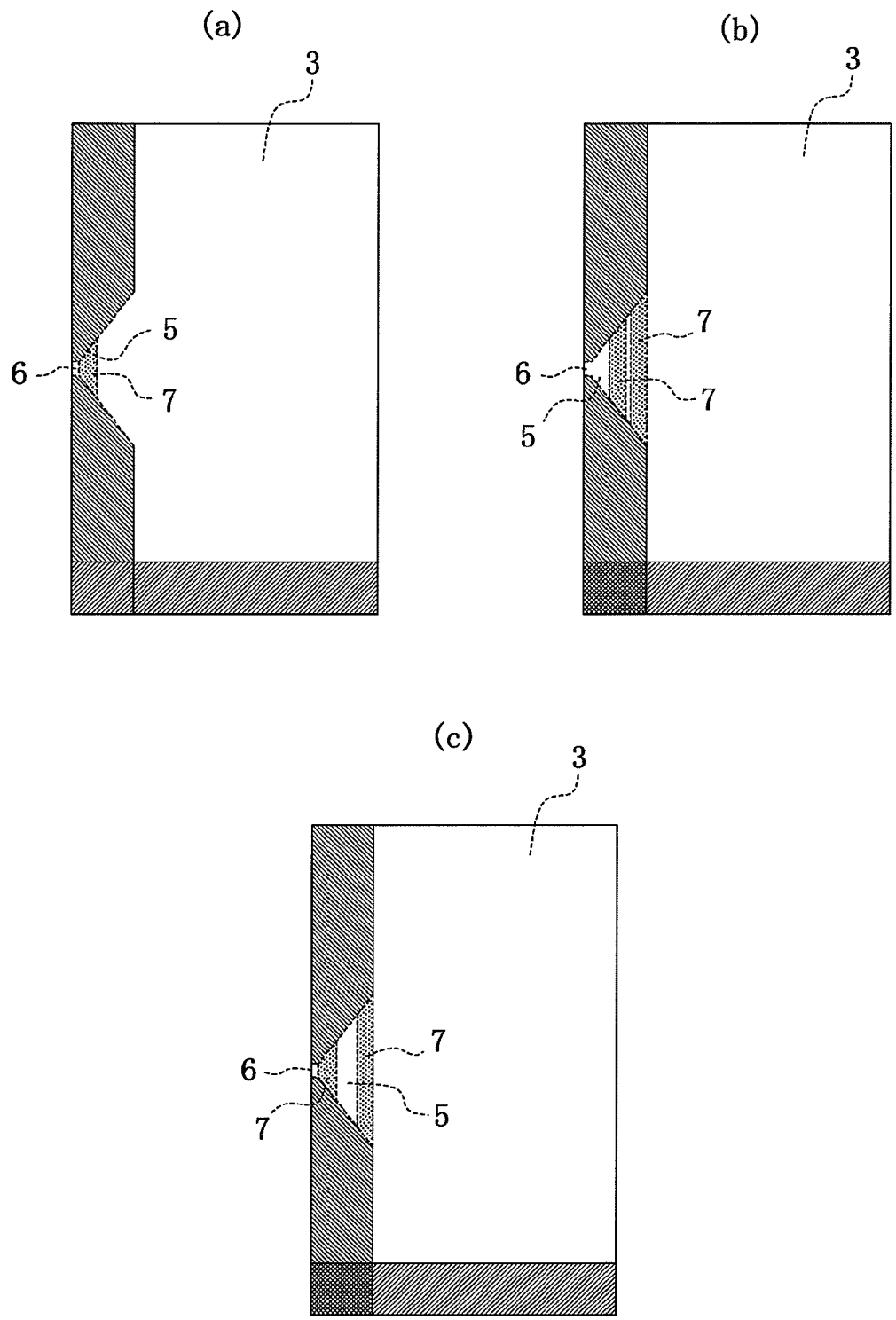
FIG. 6 is a schematic view showing a modification embodiment of forming an easily separable portion(s) in a tapered pouring path likewise FIG. 5.

FIG. 6 shows a modification example of the easily separable portion 7 wherein the width of the pouring path 5 is gradually narrowed as it is separated from the filling space 3 for the packed material. FIG. 6(*a*) shows a case that the easily separable portion 7 is formed adjacent to the exit 6 of the pouring path 5. In this case, the volume of the filling space 3 for the packed material can be increased.

FIGS. 6(*b*) and (*c*) show a case that plural required places in the extending direction of the pouring path 5, two places in the figure are provided with two easily separable portions 7 arranging with an interval each other and blocking the pouring path 5. The arranging positions of these easily separable portions 7 are an end portion of the path side the filling space 3 for the packed material and a middle portion in the extending direction of the pouring path 5 in FIG. 6(*b*), and an end portion of the pouring path 5 side the filling space 3 for the packed material and an end portion side the exit thereof in FIG. 6(*c*), respectively.

Even if unintended separation is caused in either easily separable portion 7, the leakage of the liquid packed material can be effectively prevented by the other easily separable portion 7.

And also, the same effects as previously mentioned on the butt-seamed package bag 1 even in these modification examples shown in FIG. 6 can be provided based on the intentional separation of the easily separable portions 7, which is similar to the package body 8 formed by filling and packing the liquid packing material in the package bag 1.

EXPLANATION OF SYMBOLS

1 butt-seamed package bag
2 laminate film for package
3 filling space for the packed material
4 butt-seamed joint portion (back lined joint portion)
5 pouring path
6 exit
7 easily separable portion
8 package body
11 heat seal roller
12 box motion type heat seal blade
13 undersurface plate
14 top surface plate

What is claimed is:

1. A butt-seamed package bag configured to be stored and transported in a flat posture, comprising:
   a laminate film including a sealant layer having two side portions joined at a butt-seamed joint portion, and top and bottom portions joined, such that the joined portions define a filling space for a packed material, wherein
   a pouring path for the packed material is provided at an intermediate position between both side portions, and is disposed in a middle part of the butt-seamed joint portion in an extending direction thereof, and
   at least a part of the pouring path is provided with a heat sealed separable portion having a joint seal strength relatively lower than a joint seal strength of the butt-seamed joint portion such that when the butt-seamed package bag is in the flat posture and the filling space is pressed during storage or transport of the butt-seamed package bag, the heat sealed separable portion remains sealed, and when both side portions are folded about the butt-seamed joint portion into a mountain state and the packed material in the filling space is pressed during a pouring operation, the heat sealed separable portion is separated by the pressure of the packed material being pressed to allow the single packed material to flow out of the pouring path.

2. The butt-seamed package bag according to claim 1, wherein a width of the pouring path gradually narrows as a distance from the filling space for the packed material is increased.

3. The butt-seamed package bag according to claim 1, wherein a width of the pouring path is constant over a whole in an extending direction of the pouring path.

4. The butt-seamed package bag according to claim 1, wherein the heat sealed separable portion is provided adjacent to an exit of the pouring path.

5. The butt-seamed package bag according to claim 1, wherein the heat sealed separable portion is provided over the whole of the pouring path.

6. The butt-seamed package bag according to claim 1, wherein the heat sealed separable portion is a plurality of heat sealed separable portions that are provided at plural required places in the extending direction of the pouring path.

7. The butt-seamed package bag according to claim 2, wherein the heat sealed separable portion is provided adjacent to an exit of the pouring path.

8. The butt-seamed package bag according to claim 2, wherein the heat sealed separable portion is provided over the whole of the pouring path.

9. The butt-seamed package bag according to claim 2, wherein the heat sealed separable portion is a plurality of heat sealed separable portions that are provided at plural required places in the extending direction of the pouring path.

10. The butt-seamed package bag according to claim 3, wherein the heat sealed separable portion is provided adjacent to an exit of the pouring path.

11. The butt-seamed package bag according to claim 3, wherein the heat sealed separable portion is provided over the whole of the pouring path.

12. The butt-seamed package bag according to claim 3, wherein the heat sealed separable portion is a plurality of heat sealed separable portions that are provided at plural required places in the extending direction of the pouring path.

13. A method for using a package bag, formed by filling and packing a single type liquid packing material in the filling space for the packed material of the butt-seamed package bag according to claim 1, the method comprising:
folding the package bag about the butt-seamed joint portion into the mountain state; and
pouring the single type liquid packing material through the pouring path by pressing the filling space for the packed material in a thickness direction to separate the heat sealed separable portion.

14. A method for using a package bag formed by filling and packing a single type liquid packing material in the filling space for the packed material of the butt-seamed package bag according to claim 2, the method comprising:
folding the package bag about the butt-seamed joint portion into the mountain state; and
pouring the single type liquid packing material through the pouring path by pressing the filling space for the packed material in a thickness direction to separate the heat sealed separable portion.

15. A method for using a package bag formed by filling and packing a single type liquid packing material in the filling space for the packed material of the butt-seamed package bag according to claim 3, the method comprising:
folding the package bag about the butt-seamed joint portion into the mountain state; and
pouring the single type liquid packing material through the pouring path by pressing the filling space for the packed material in a thickness direction to separate the heat sealed separable portion.

16. A method for using a package bag formed by filling and packing a single type liquid packing material in the filling space for the packed material of the butt-seamed package bag according to claim 4, the method comprising:
folding the package bag about the butt-seamed joint portion into the mountain state; and
pouring the single type liquid packing material through the pouring path by pressing the filling space for the packed material in a thickness direction to separate the heat sealed separable portion.

17. A method for using a package bag formed by filling and packing a single type liquid packing material in the filling space for the packed material of the butt-seamed package bag according to claim 5, the method comprising:
folding the package bag about the butt-seamed joint portion into the mountain state; and
pouring the single type liquid packing material through the pouring path by pressing the filling space for the packed material in a thickness direction to separate the heat sealed separable portion.

18. A method for using a package bag formed by filling and packing a single type liquid packing material in the filling space for the packed material of the butt-seamed package bag according to claim 6, the method comprising:
folding the package bag about the butt-seamed joint portion into the mountain state; and
pouring the single type liquid packing material through the pouring path by pressing the filling space for the packed material in a thickness direction to separate the heat sealed separable portion.

19. A method for using a package bag formed by filling and packing a single type liquid packing material in the filling space for the packed material of the butt-seamed package bag according to claim 7, the method comprising:
folding the package bag about the butt-seamed joint portion into the mountain state; and
pouring the single type liquid packing material through the pouring path by pressing the filling space for the packed material in a thickness direction to separate the heat sealed separable portion.

20. A method for using a package bag formed by filling and packing a single type liquid packing material in the filling space for the packed material of the butt-seamed package bag according to claim 8, the method comprising:
folding the package bag about the butt-seamed joint portion into the mountain state; and
pouring the single type liquid packing material through the pouring path by pressing the filling space for the packed material in a thickness direction to separate the heat sealed separable portion.

21. A method for using a package bag formed by filling and packing a single type liquid packing material in the filling space for the packed material of the butt-seamed package bag according to claim 9, the method comprising:
folding the package bag about the butt-seamed joint portion into the mountain state; and
pouring the single type liquid packing material through the pouring path by pressing the filling space for the packed material in a thickness direction to separate the heat sealed separable portion.

22. A method for using a package bag formed by filling and packing a single type liquid packing material in the filling space for the packed material of the butt-seamed package bag according to claim 10, the method comprising:
folding the package bag about the butt-seamed joint portion into the mountain state; and
pouring the single type liquid packing material through the pouring path by pressing the filling space for the packed material in a thickness direction to separate the heat sealed separable portion.

23. A method for using a package bag formed by filling and packing a single type liquid packing material in the filling space for the packed material of the butt-seamed package bag according to claim 11, the method comprising:
folding the package bag about the butt-seamed joint portion into the mountain state; and
pouring the single type liquid packing material through the pouring path by pressing the filling space for the packed material in a thickness direction to separate the heat sealed separable portion.

24. A method for using a package bag formed by filling and packing a single type liquid packing material in the filling space for the packed material of the butt-seamed package bag according to claim 12, the method comprising:
folding the package bag about the butt-seamed joint portion into the mountain state; and
pouring the single type liquid packing material through the pouring path by pressing the filling space for the packed material in a thickness direction to separate the heat sealed separable portion.

25. The butt-seamed package bag according to claim 1, wherein the heat sealed separable portion is provided along an edge portion of the filling space.

26. The butt-seamed package bag according to claim 1, wherein a thickness of the package body when both side portions are folded about the butt-seamed joint portion into the mountain state is twice as thick as a thickness of the package body when both side portions are in the flat posture.

27. The butt-seamed package bag according to claim 1, wherein the heat sealed separable portion is formed by setting at least one of a heating temperature and a pressing force to a relatively lower value than that of the butt-seamed joint portion such that the joint seal strength of the heat sealed separable portion is relatively lower than the joint seal strength of the butt-seamed joint portion.

28. The butt-seamed package bag according to claim 1, wherein the butt-seamed joint portion is defined by the heat sealed separable portion that extends over a full length of the laminate film and a heat sealed portion defined at free end side portions of the laminate film in a butt-seamed state such that a shape for the pouring path is defined.

29. The butt-seamed package bag according to claim 1, wherein the laminate film is a biaxially-oriented nylon film laminated with a straight-chain low density polyethylene film.

* * * * *